United States Patent [19]

Morrow

[11] 4,096,657

[45] Jun. 27, 1978

[54] MINNOW BAIT KIT

[76] Inventor: George W. Morrow, 19 Rocco Dr., Little Rock, Ark. 72209

[21] Appl. No.: 701,321

[22] Filed: Jun. 30, 1976

[51] Int. Cl.² ............................................. A01K 97/04
[52] U.S. Cl. ...................................................... 43/56
[58] Field of Search ................. 43/56, 54.5 R, 54.5 A, 43/55, 4; 294/3; 220/20

[56] References Cited

U.S. PATENT DOCUMENTS

| | | | |
|---|---|---|---|
| 2,016,488 | 10/1935 | Eckhaus | 220/20 |
| 2,093,132 | 9/1937 | Logan | 43/56 |
| 3,000,132 | 9/1961 | Koistinen | 43/56 |
| 3,201,888 | 8/1965 | Barbee | 43/4 |
| 3,955,306 | 5/1976 | Handa | 43/56 |

Primary Examiner—Louis G. Mancene
Assistant Examiner—Robert P. Swiatek
Attorney, Agent, or Firm—Ralph R. Pittman

[57] ABSTRACT

A live minnow bait kit for making accessible a submerged minnow and facilitating its attachment to a fishhook includes a bucket having an internally tapered wall of heat insulating material. The enclosed space within the bucket is divided into upper and lower compartments by means of a horizontally disposed flange projecting radially inward from the internally tapered wall at an elevation between the top and bottom of the bucket. The flange trebly functions as (a) a floor surface of the upper compartment upon which a minnow-handling tongs of the kit may be rested for ready availability; (b) an upper limit stop in the path of a perforated false bottom moving vertically upward through the lower compartment coincident with a swingable opening of a lid hingedly connected to the bucket; and (c) as an upper support for a central guide post upon which the false bottom is slidably mounted.

5 Claims, 4 Drawing Figures

MINNOW BAIT KIT

BACKGROUND

Essential steps in using live minnows as fish bait are: transport of the minnows submerged in water; aeration of the water to preclude suffocation of the minnows; and the impalement of a minnow on a fishhook, this step being desirably accomplished without manually handling the minnow. The minnow must first be removed from the water, then oriented within some sort of clasping tool to a position for conveniently passing the barbed end of a fishhook through the minnow, and finally the impaled minnow removed from the tool, all without physically contacting the minnow.

Very few prior art structures enable the performance of this hookbaiting program, and those represented as having the capability of doing so are believed to be both unnecessarily complex in construction and inconvenient in operation.

SUMMARY OF THE INVENTION

The minnow bait kit described herein includes an inwardly tapering bucket divided into a small upper compartment which houses a minnow-handling tongs and a large lower compartment for containing water-submerged minnows. The wall and bottom of the bucket enclose an internal space in the shape of an inverted truncated cone, the tapering wall being required to facilitate plastic molding of the bucket.

A horizontally disposed peripheral flange forms the boundary between the compartments, the flange being rigidly secured to the interior wall of the bucket and projecting radially inward to define upper and lower flat surfaces along the respective sides of the flange and a large opening connecting the upper and lower compartments.

A guide post is rigidly secured to the midpoint of the bottom of the bucket, extending axially upward therefrom to an elevation slightly above that of the flange, and a false bottom, in the form of a perforated tray and sized to conform with the internal bottom surface of the bucket, is slidably mounted on the guide post and movable up or down therealong between its lower position at the bottom of the bucket to an upper position in engagement with the lower surface of the peripheral flange.

For reciprocably actuating the vertically movable perforated tray, a pair of radially spaced flexible raise and lower lines mechanically join the tray to a swingably mounted lid hinged to the bucket, the lines being maintained along rectilinear paths within the lower compartment by their extension through radially spaced apertures in a crossbar secured at the top of the guide post, the apertures being located in vertical alignment with the points of attachment of the lines to the tray.

The articulation of the members connecting the lid to the perforated tray is such that the tray engages the lower surface of the inwardly projecting flange when the lid is in the open position. Under this condition, there is no opening present between the outer edge of the tray and the wall of the bracket which would otherwise be present because of the internal taper of the bucket.

The upper surface of the inwardly projecting flange is utilized to support within the upper compartment a minnow-handling tongs suitable for holding a minnow during impalement by a fishhook.

In use, the large lower compartment of the bucket is partially filled with water to a level below and spatially adjacent to the peripheral flange, the minnows placed on the upraised perforated tray, and the lid closed to lower the tray and submerge the minnows for transport. If a minnow is desired for bait, the lid is opened, coincidently raising the tray up above the water level with one or more minnows thereon. If it is desired to aerate the water, the lid is sequentially opened and closed for a number of cycles, thus mixing the oxygen in the air within the space between the upper position of the perforated tray and the surface of the water.

Considerations of low cost and low heat conductivity indicate a foamed plastic, such as styrofoam, as a preferable material for the bucket and lid; other suitable plastics are available for other parts of the kit. It is noted that it is essential that the material of the false bottom have a specific gravity greater than that of water; a number of mineral filled mechanically suitable plastics are readily available.

DESCRIPTION OF THE PREFERRED EMBODIMENT

Figure 1:
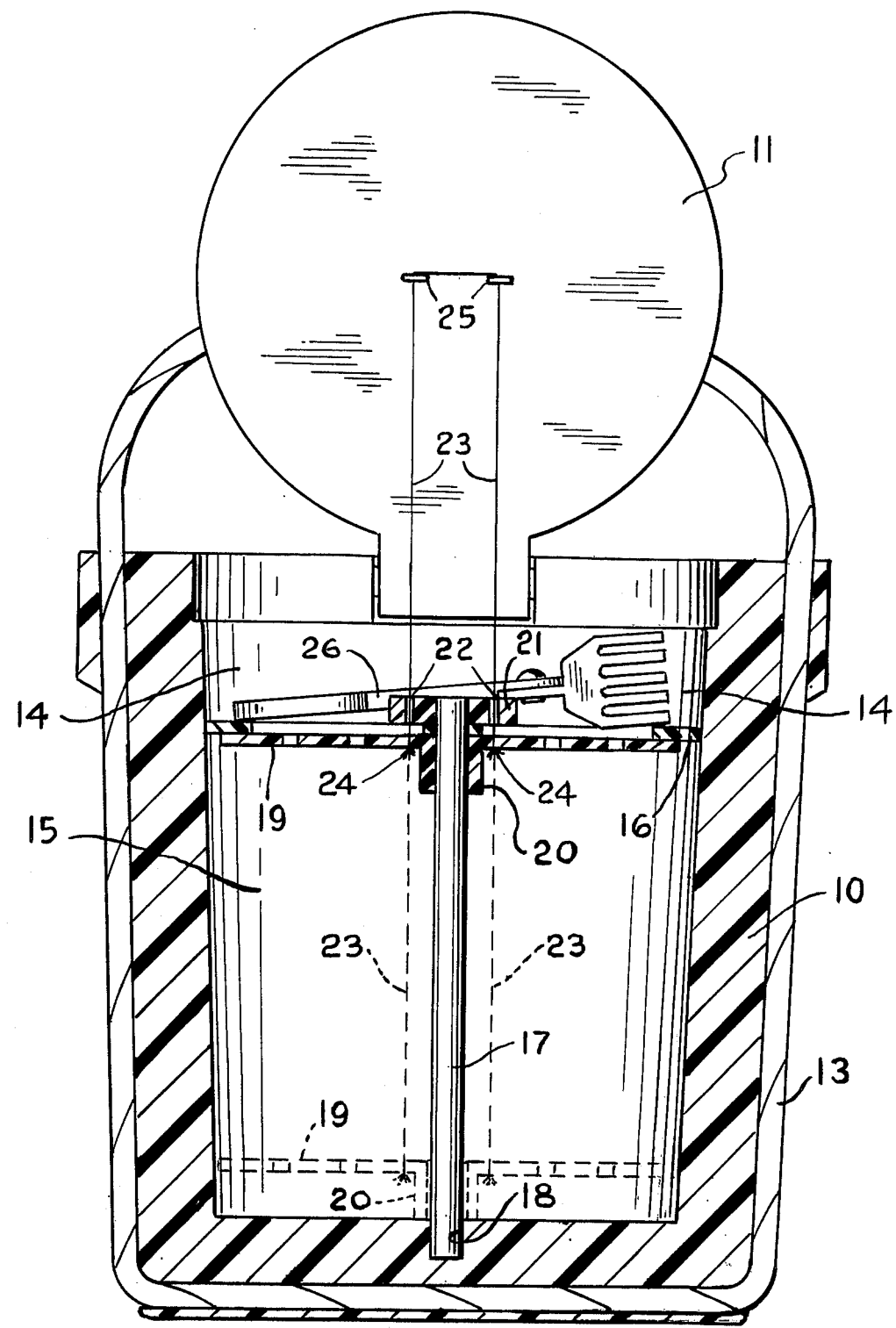
FIG. 1 is an elevation of the bait kit, shown mostly in section, the hinged lid having been swung to the open position to concurrently raise the vertically movable perforated tray to engagement with the compartment dividing flange.
Figure 2:
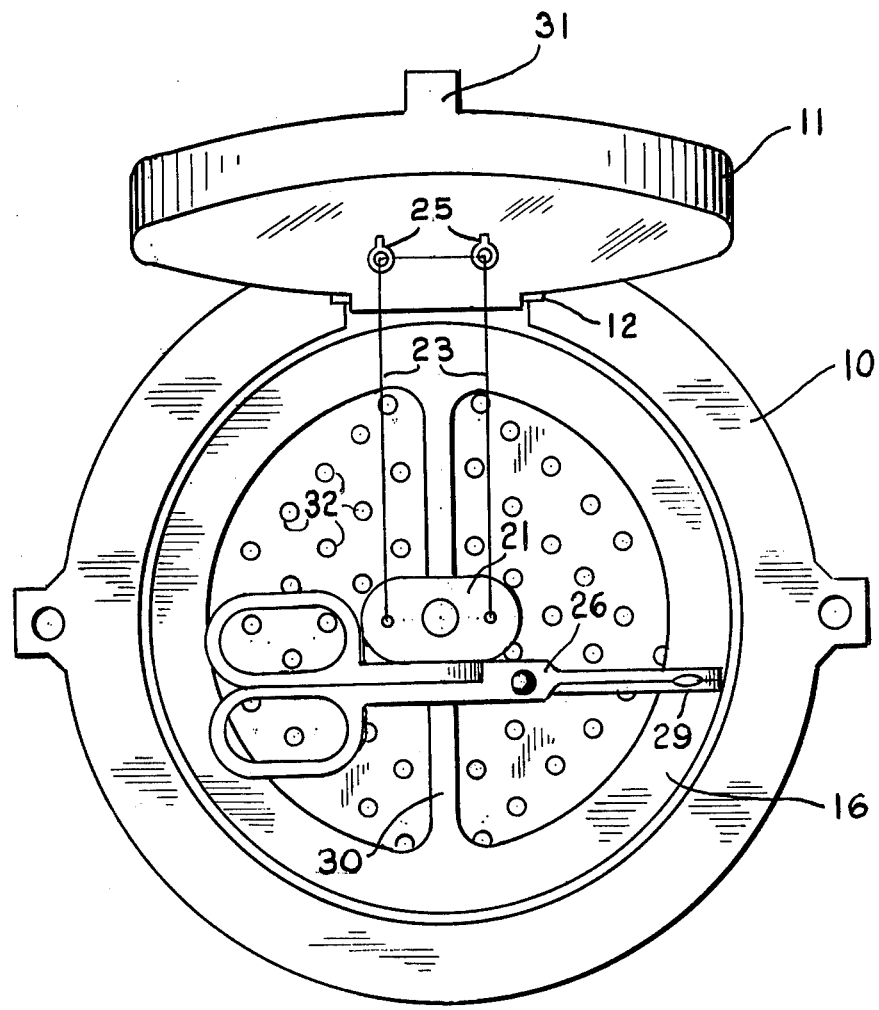
FIG. 2 is a plan view, again with the lid in the open position.

As illustrated in FIGS. 1 and 2, the inner surface of the bucket 10 defines an enclosure in the shape of a frustum of an inverted cone, the peripheral wall flaring outwardly from bottom to top. A lid 11 is hingedly mounted at the upper end wall on the pivotal connection 12, and an integral handhold 31 projects from the top of the lid at a location opposite the pivotal mounting.

A flange 16, in the shape of a flat ring, is rigidly secured along its outer circumference to the inner wall of the bucket, projecting radially inward from the wall and dividing the conical cavity of the bucket into a small upper compartment 14 and a larger lower compartment 15. The inner margin of the ring-shaped flange 16 encloses an area less than that of the bottom surface within the bucket.

A guide post 17 is rigidly fixed in the centrally located socket 18 at the bottom of the bucket, extending upwardly therefrom to an elevation slightly above the top surface of the flange 16, the latter having a pair of opposed coplanar spokes 30 extending inwardly from the circular portion of the flange to engagement with and for supporting the upper end of the guide post 17, there being mounted at the top of the guide post a small transversely extending crossbar 21.

A vertically movable false bottom 19, through which a plurality of perforations 32 are made, has a central tubular sleeve portion 20 which is slipfitted on the post below the flange for slidably guiding the reciprocating up and down movement of the false bottom 19. In its lower position, the false bottom 19 is positioned near the bottom of the bucket; in its upper position, the outer marginal portion of the false bottom engages the inner marginal portion of the flange 16.

The coextensive raise and lower lines 23, which may be Nylon cord, are fastened to the false bottom 19 at two radially spaced points 24 adjacent to the lower end of the guide post 17, extending vertically upward therefrom through a pair of similarly spaced vertically aligned holes 22 in the crossbar 21, and thence vertically upward to the similarly spaced eye fasteners 25 in the lid 11, the fasteners 25, the holes 22 and the attachments 24 defining vertical lines along opposing sides of the vertical axis of the bucket when the lid 11 is in the closed position.

Figure 4:
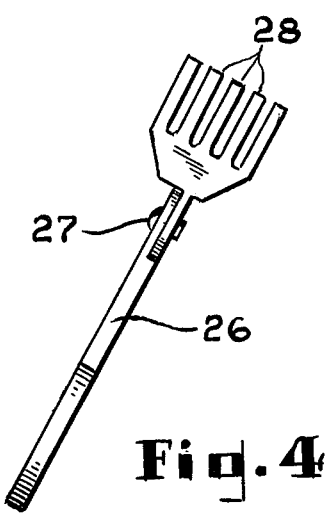
FIG. 4 is a plan view of the associated minnow-handling tongs.

The upper compartment 14 is utilized as a receptacle for containing the minnow-handling tongs 26, which normally rests on the upper surface of the flange 16. The tongs 26, shown in FIGS. 1, 2 and 4, is a pincers construction with scissors-like handles, the handles and grasping jaws 28 moving about the pivot 27. The jaws 28 include a pair of arrays of equally spaced complementary teeth, the arrays having mutually mating transverse inside grooves to provide the minnow-grasping recess 29 shown in FIG. 2.

Figure 3:
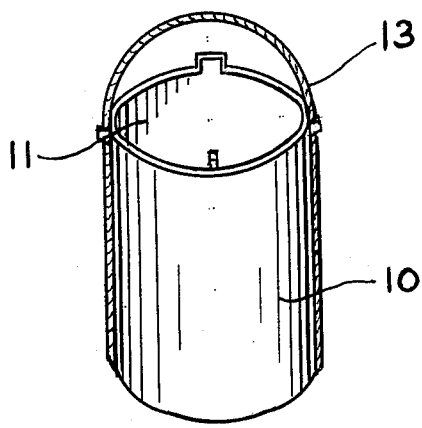
FIG. 3 illustrates the appearance of the kit when closed for transport.

As shown in FIG. 3, a convenient and inexpensive carrying handle is provided by means of a flexible rope 13, which extends within a diametral groove in the bottom of the bucket, up opposing sides and over the top of the bucket.

It may be observed that a continuously widening, radially extending circumferential opening accompanies the raising of the false bottom 19 to its upper position, due to the internal taper of the bucket. An important function of the dividing flange 16 is to close this opening when the false bottom is completely raised, to thereby preclude minnows lifted above the surface of the water flouncing over the edge of the false bottom and back into the water.

In service, water containing live minnow bait partially fills the lower compartment, a relatively small air space having a height not less than one-eighth of the inside diameter of the dividing flange being left unfilled and thus interposed between the surface of the water and the bottom surface of the dividing flange. When the false bottom is sequentially moved vertically through the air space down into and up out of the water in response to a series of opening and closing movements of the lid, some of the oxygen in the air is admixed with the water, replacing suffocating carbon dioxide produced by the minnows and prolonging their life span.

While only a quite shallow upper compartment may be needed to provide housing space for the tongs, it should also be noted that the height of the wall above the flange should be sufficient to prevent self-ejection of minnows over the top of the wall from their location on the top of the upraised false bottom.

The structure of the bait kit as just described is such that, following an opening movement of the lid, the tongs are readily at hand to pick up and hold a minnow between its jaws while the barbed end of a fishhook is passed transversely therethrough at one of the interspaces between the opposing jaw teeth, there being no necessity for manually contacting minnow during the entire hook-baiting procedure.

What is claimed is:

1. A minnow bait kit for making accessible a submerged minnow and facilitating its attachment to a fishhook comprising:
    a bucket having an enclosure in the shape of an inverted frustum of a cone, a flat bottom and a hinged lid swingable between an open and a closed position;
    a horizontally disposed circular peripheral flange rigidly secured to the internal wall of said bucket, said flange projecting radially inward and dividing the enclosed space into a small dry upper compartment and a larger water-containing lower compartment suitable for containing submerged live minnows;
    a single fixed guide post extending axially from the bottom of said bucket to an elevation above said flange;
    a submergible perforated false bottom normally disposed coextensive with the bottom of said bucket, said false bottom being slidably mounted on said guide post and movable upwardly therealong for capturing a submerged minnow and conveying the minnow to an upper above-water position determined by the engagement of said false bottom with the lower surface of said inwardly projecting flange; said flange including a pair of diametrically opposed spokes coplanar with the circular portion thereof, said spokes extending inwardly from said circular portion to engagement with the upper end of said guide post;
    a tongs adapted to pick a minnow from the up-raised false bottom, said tongs manually resting on the upper surface of said flange within said upper compartment; and
    coupling means effective to lift said false bottom to said upper position coincident with the opening movement of said lid;
    said coupling means including a crossbar mounted at the top of said guide post, said crossbar having a pair of vertically directed apertures radially spaced from opposing sides of said guide post, a flexible cord joined at its ends to said false bottom at locations spatially adjacent to opposing sides of said guide post and extending upwardly therealong in spaced relationship through said apertures to similarly spaced attachment fasteners secured to said hinged lid.

2. The minnow bait kit in accordance with claim 1, wherein the thermal conductivity of the enclosure is not more than that provided by a wall thickness of styrofoam which is not less than one-tenth of the average inside diameter of the bucket.

3. The minnow bait kit as described in claim 2, wherein the vertical distance from the top of said flange to the top of said bucket is not less than twice the thickness of said lid.

4. The minnow bait kit as claimed in claim 1, wherein the outer end portion of the jaws of the tongs are registering arrays of transversely spaced teeth having complementary grooves running transversely along the inner sides of the teeth.

5. The minnow bait kit according to claim 1, wherein said false bottom has a coaxial tubular sleeve slip-fitted on said guide post.

* * * * *